(12) United States Patent
Jiang et al.

(10) Patent No.: US 12,369,120 B2
(45) Date of Patent: Jul. 22, 2025

(54) INFORMATION DETERMINING METHOD AND USER EQUIPMENT

(71) Applicant: VIVO MOBILE COMMUNICATION CO.,LTD., Guangdong (CN)

(72) Inventors: Dajie Jiang, Guangdong (CN); Xiaodong Shen, Guangdong (CN)

(73) Assignee: VIVO MOBILE COMMUNICATION CO., LTD., Guangdong (CN)

(*) Notice: Subject to any disclaimer, the term of this patent is extended or adjusted under 35 U.S.C. 154(b) by 443 days.

(21) Appl. No.: 17/518,772

(22) Filed: Nov. 4, 2021

(65) Prior Publication Data

US 2022/0060984 A1 Feb. 24, 2022

Related U.S. Application Data

(63) Continuation of application No. PCT/CN2020/080234, filed on Mar. 19, 2020.

(30) Foreign Application Priority Data

May 10, 2019 (CN) .......................... 201910390531.9

(51) Int. Cl.
*H04W 52/02* (2009.01)
*H04W 24/08* (2009.01)
*H04W 72/23* (2023.01)

(52) U.S. Cl.
CPC ....... *H04W 52/0229* (2013.01); *H04W 24/08* (2013.01); *H04W 72/23* (2023.01)

(58) Field of Classification Search
CPC ............. H04W 52/0229; H04W 24/08; H04W 72/23; H04W 52/0209; H04W 52/0225;
(Continued)

(56) References Cited

U.S. PATENT DOCUMENTS

2015/0189589 A1 7/2015 Legg et al.
2020/0178175 A1* 6/2020 Jung ................. H04W 52/0216
(Continued)

FOREIGN PATENT DOCUMENTS

CN 104641695 A 5/2015
CN 109309950 A 2/2019
(Continued)

OTHER PUBLICATIONS

3GPP TSG RAN WG1 #97; R1-1906980; Source: Samsung; Title: PDCCH-based power saving signal/channel; Reno, USA, May 13-17, 2019 (Year: 2019).*
(Continued)

*Primary Examiner* — Mohammed S Chowdhury
(74) *Attorney, Agent, or Firm* — Price Heneveld LLP (57) ABSTRACT

Embodiments of this disclosure disclose an information determining method and user equipment. The method includes: monitoring a target channel or a target signal to acquire a first characteristic, where the first characteristic is a characteristic of the target channel or the target signal; and determining first information based on the first characteristic, where in a case that the target channel or the target signal is used to indicate a first power-saving mode of the UE, the first information is a second power-saving mode of the UE; or in a case that the target channel is used to indicate whether the UE monitors a PDCCH associated with the target channel, or the target signal is used to indicate whether the UE monitors a PDCCH associated with the target signal, the first information is a second characteristic of the PDCCH or the second power-saving mode of the UE.

20 Claims, 4 Drawing Sheets

(58) Field of Classification Search
CPC .......... H04W 52/0235; H04W 52/0212; Y02D 30/70
See application file for complete search history.

(56) References Cited

U.S. PATENT DOCUMENTS

| | | |
|---|---|---|
| 2020/0214078 A1 | 7/2020 | Jiang et al. |
| 2021/0144646 A1* | 5/2021 | Xu .................... H04W 52/0235 |
| 2021/0243763 A1* | 8/2021 | Zhou .................... H04L 1/1671 |
| 2022/0053470 A1* | 2/2022 | Chen .................... H04W 76/28 |
| 2022/0053553 A1* | 2/2022 | Li .................... H04W 72/1263 |
| 2022/0060989 A1* | 2/2022 | Yang .................... H04W 72/23 |
| 2022/0132425 A1* | 4/2022 | Seo .................... H04W 52/0235 |
| 2022/0159700 A1* | 5/2022 | Maleki .................... H04W 72/23 |
| 2022/0167386 A1* | 5/2022 | Takeda .................... H04W 52/0258 |
| 2022/0174651 A1* | 6/2022 | Seo .................... H04W 76/28 |
| 2022/0201605 A1* | 6/2022 | Yang .................... H04W 52/0235 |

FOREIGN PATENT DOCUMENTS

| | | |
|---|---|---|
| CN | 109547155 A | 3/2019 |
| JP | 2018117393 A | 7/2018 |
| WO | 2011160291 A1 | 12/2011 |
| WO | 2012092772 A1 | 7/2012 |
| WO | 2014134807 A1 | 9/2014 |
| WO | 2019015458 A1 | 1/2019 |

OTHER PUBLICATIONS

3GPP TSG RAN WG1 Meeting #96bis; R1-1903988; Source: Huawei, HiSilicon; Title: PDCCH based power saving signal/channel; Xi'an, China, Apr. 8-12, 2019. (Year: 2019).*

3GPP TSG RAN WG1 Meeting #97;R1-1906579; Source: OPPO; Title: Discussion on PDCCH-based power saving signal/channel; Reno, USA, May 13-17, 2019. See §2-§3. (Year: 2019).*

3GPP TSG RAN WG1 Meeting #97 ; R1-1906695 ; Source: LG Electronics ; Title: Discussion on PDCCH-based power saving signal/channel; Reno, USA, May 13-17, 2019. (Year: 2019).*

CATT, "UE Power saving schemes with power saving signal/channel/procedures", 3GPP TSG RAN WG1 Ad-Hoc Meeting 1901, R1-1900345, Taipei, Jan. 21-25, 2019.

Interdigital, Inc., "On UE Power Saving Techniques", 3GPP TSG RAN WG1 #96, R1-1902619, Athens, Greece, Feb. 25-Mar. 1, 2019.

VIVO, "PDCCH-based power saving signal/channel", 3GPP TSG RAN WG1 #97, R1-1906170, Reno, USA, May 13-17, 2019.

ZTE, "Power consumption reduction for physical channels for MTC", 3GPP TSG RAN WG1 Meeting #90, R1-1713014, Prague, Czech Republic, Aug. 21-25, 2017.

* cited by examiner

INFORMATION DETERMINING METHOD AND USER EQUIPMENT

This application is a continuation application of International Application No. PCT/CN2020/080234 filed on Mar. 19, 2020, which claims priority to Chinese Patent Application No. 201910390531.9, filed with the China National Intellectual Property Administration on May 10, 2019 and entitled "INFORMATION DETERMINING METHOD AND USER EQUIPMENT", which are incorporated herein by reference in their entireties.

TECHNICAL FIELD

Embodiments of this disclosure relate to the field of communications technologies, and in particular, to an information determining method and user equipment.

BACKGROUND

Generally, user equipment (UE) may periodically monitor a physical downlink control channel (PDCCH) in a discontinuous reception (DRX) mode, for receiving downlink data, uplink grant information, or the like. In DRX, the UE enters a wake up mode when there is data, and enters a sleep mode when there is no data, so as to save power.

Specifically, connected mode DRX (Connected DRX, CDRX) of UE may generally include a CDRX on duration and a CDRX off duration. When the UE receives a power-saving signal from a network device before start of the CDRX on duration, if the power-saving signal indicates monitoring of a PDCCH during the CDRX on duration corresponding to the power-saving signal, the UE may monitor the PDCCH by using characteristic information carried in the power-saving signal; and if the power-saving signal does not indicate monitoring of the PDCCH or the power-saving signal being not detected, the UE does not monitor the PDCCH.

However, in the foregoing process, the characteristic information used when the UE monitors the PDCCH is configured for the UE by the network device using the power-saving signal, resulting in signaling overheads between the network device and the UE.

SUMMARY

Embodiments of this disclosure provide an information determining method and user equipment, to reduce signaling overheads between a network device and UE.

To resolve the foregoing technical problem, the following technical solutions are used in the embodiments of this disclosure:

According to a first aspect, in an embodiment of this disclosure, an information determining method is provided, applied to UE, where the information determining method includes: monitoring a target channel or a target signal to acquire a first characteristic, where the first characteristic is a characteristic of the target channel or the target signal; and determining first information based on the first characteristic, where in a case that the target channel or the target signal is used to indicate a first power-saving mode of the UE, the first information is a second power-saving mode of the UE; or in a case that the target channel is used to indicate whether the UE monitors a physical downlink control channel PDCCH associated with the target channel, or that the target signal is used to indicate whether the UE monitors a PDCCH associated with the target signal, the first information is a second characteristic of the PDCCH or the second power-saving mode of the UE.

According to a second aspect, in an embodiment of this disclosure, UE is provided, where the UE includes: a monitoring unit and a determining unit. The monitoring unit is configured to monitor a target channel or a target signal to acquire a first characteristic, where the first characteristic is a characteristic of the target channel or the target signal. The determining unit is configured to determine first information based on the first characteristic obtained by the monitoring unit, where in a case that the target channel or the target signal is used to indicate a first power-saving mode of the UE, the first information is a second power-saving mode of the UE; or in a case that the target channel is used to indicate whether the UE monitors a PDCCH associated with the target channel, or the target signal is used to indicate whether the UE monitors a PDCCH associated with the target signal, the first information is a second characteristic of the PDCCH or the second power-saving mode of the UE.

According to a third aspect, in an embodiment of this disclosure, UE is provided, where the UE includes a processor, a memory, and a computer program stored in the memory and capable of running on the processor, and when the computer program is executed by the processor, the steps of the information determining method according to the first aspect are implemented.

According to a fourth aspect, in an embodiment of this disclosure, a computer-readable storage medium is provided, where the computer-readable storage medium stores a computer program, and when the computer program is executed by a processor, the steps of the information determining method according to the first aspect are implemented.

In the embodiments of this disclosure, the UE may monitor the target channel or the target signal to acquire the first characteristic of the target channel or the target signal, and determine the first information based on the first characteristic. Because based on the first characteristic of the target channel or the target signal, the UE can determine the first information, that is, determine the second characteristic of the PDCCH or the second power-saving mode of the UE, and the network device is not required to indicate the first information to the UE by using signaling, signaling overheads between the network device and the UE can be reduced.

DETAILED DESCRIPTION OF EMBODIMENTS

The following clearly describes the technical solutions in the embodiments of this disclosure with reference to the accompanying drawings in the embodiments of this disclosure. Apparently, the described embodiments are some rather than all of the embodiments of this disclosure. All other embodiments obtained by persons of ordinary skill in the art based on the embodiments of this disclosure shall fall within the protection scope of this disclosure.

The terms such as "first" and "second" in the specification and claims of this disclosure are used to distinguish between different objects, but are not used to describe a specific order of the objects. For example, a first characteristic, a second characteristic, and the like are used to distinguish different characteristics, rather than describe a specific order of the characteristics.

In the description of the embodiments of this disclosure, unless otherwise specified, "a plurality of" means two or more. For example, a plurality of elements refer to two elements or more than two elements.

A character "I" in this specification indicates an "or" relationship between associated objects. For example, input/output indicates input or output.

In the embodiments of this disclosure, the term such as "exemplary" or "for example" is used to represent giving an example, an illustration, or a description. Any embodiment or design described as "exemplary" or "for example" in the embodiments of this disclosure should not be construed as being more preferred or advantageous than other embodiments or designs. To be precise, the use of the term such as "exemplary" or "for example" is intended to present a related concept in a specific manner.

The following describes some concepts and terms related in an information determining method and user equipment provided in the embodiments of this disclosure.

A basic mechanism of DRX is to configure a DRX cycle for UE in a radio resource control (RRC) connected state. The DRX cycle consists of an "on duration" and an "opportunity for DRX", where during the "on duration" time, the UE monitors and receives a PDCCH (that is, the UE is in the on duration); and during the "opportunity for DRX" time, the UE does not receive data of a downlink channel to reduce power consumption (that is, the UE is in a sleep duration).

Embodiments of this disclosure provide an information determining method and user equipment. The UE may monitor a target channel or a target signal to acquire a first characteristic of the target channel or the target signal, and determine first information based on the first characteristic. Because based on the first characteristic of the target channel or the target signal, the UE can determine the first information, that is, determine the second characteristic of the PDCCH or the second power-saving mode of the UE, and the network device is not required to indicate the first information to the UE by using signaling, signaling overheads between the network device and the UE can be reduced.

The information determining method and the user equipment provided in the embodiments of this disclosure may be applied to a communications system. Specifically, the information determining method and the user equipment may be applied to a process based on the communication system in which the UE determines the first information based on the first characteristic of the target channel or the target signal.

Figure 1:
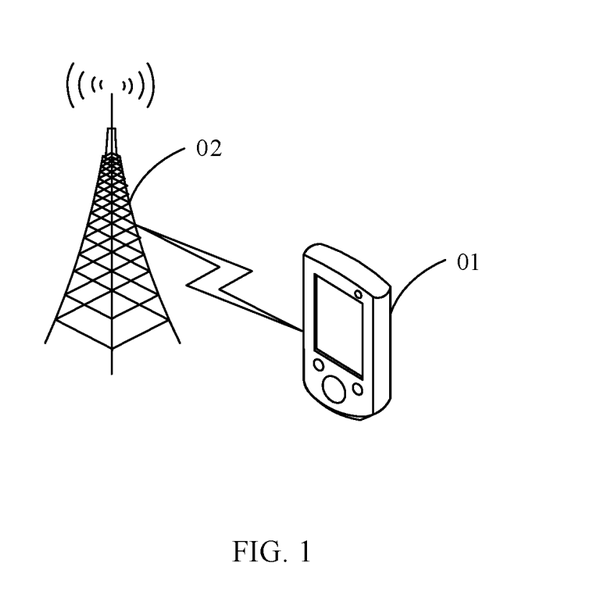
FIG. 1 is a schematic architectural diagram of a communications system according to an embodiment of this disclosure.

FIG. 1 is a schematic architectural diagram of a communications system according to an embodiment of this disclosure. As shown in FIG. 1, the communications system may include UE 01 and an access network device 02. The UE 01 and the access network device 02 may establish a connection and communicate with each other.

The UE is a device providing voice and data connectivity to a user, a handheld device having a wired/wireless connection function, or another processing device connected to a wireless modem. The UE may communicate with one or more core network devices via a radio access network (RAN). The UE may be a mobile terminal such as a mobile phone (or referred to as a "cellular" phone) or a computer having a mobile terminal, or may be a portable, pocket-sized, handheld, computer built-in, or vehicle-mounted mobile apparatus, which exchanges voice and data with the RAN. For example, the mobile apparatus is a device such as a personal communication service (PCS) phone, a cordless phone, a session initiation protocol (SIP) phone, a wireless local loop (WLL) station, or a personal digital assistant (PDA). The UE may also be referred to as a user agent, a terminal device, or the like.

The access network device may be a base station. The base station is an apparatus deployed in the RAN to provide a wireless communication function for the UE. The base station may include various forms of macro base stations, micro base stations, relay stations, access points, and the like. In systems using different radio access technologies, a device with a base station function may have different names. For example, in a third-generation mobile communications (3G) network, the device is referred to as a base station (NodeB); in an LTE system, the device is referred to as an evolved base station (evolved NodeB, eNB, or eNodeB); and in a fifth-generation mobile communications (5G) network, the device is referred to as a gNB, and so on. With the evolution of the communications technologies, the name "base station" may change. However, the term used does not constitute any limitation on the protection scope of this disclosure.

With reference to the accompanying drawings, the following describes in detail the information determining method and the user equipment provided in the embodiments of this disclosure by using specific embodiments and application scenarios thereof.

Figure 2:
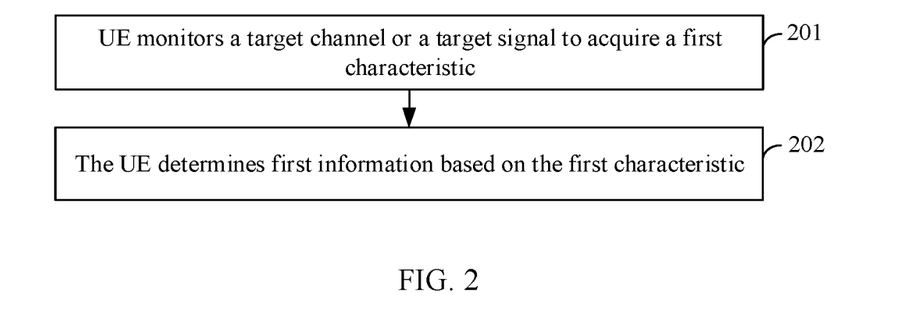
FIG. 2 is a first schematic diagram of an information determining method according to an embodiment of this disclosure.

Based on the communications system shown in FIG. 1, an embodiment of this disclosure provides an information determining method. As shown in FIG. 2, the information determining method may include the following steps 201 and 202.

Step 201: UE monitors a target channel or a target signal to acquire a first characteristic.

In this embodiment of this disclosure, the first characteristic is a characteristic of the target channel or the target signal.

In this embodiment of this disclosure, the UE may determine the first characteristic after receiving the target channel (or the target signal).

Optionally, in this embodiment of this disclosure, the target channel may be a power-saving channel. The power-saving channel may be a channel similar to PDCCH, and the power-saving channel carries downlink control information (DCI).

Optionally, in this embodiment of this disclosure, the target signal may be a power-saving signal, and the power-saving signal may be a sequence-based signal. For example, the power-saving signal may be a signal similar to a channel state information reference signal (CSI-RS) or a binary on-off keying (OOK) signal.

Optionally, in this embodiment of this disclosure, the first characteristic of the target channel may include at least one of the following: a bandwidth part (BWP) in which the target channel is located, a search space (SS) in which the target channel is located, a control resource set (CORESET) in which the target channel is located, a DCI format of the target channel, or a radio network temporary identifier (RNTI) of the target channel.

Optionally, in this embodiment of this disclosure, the first characteristic of the target signal may include at least one of the following: a root sequence of a target sequence, a cyclic shift value of the target sequence, a generator polynomial of the target sequence, an initialization mode of the target sequence, or a cover code of the target sequence, where the target sequence is a sequence of the target signal.

Optionally, in this embodiment of this disclosure, the target sequence may include at least one of the following: a ZC sequence, an m sequence, or a Gold sequence.

For example, the target sequence including the Gold sequence is taken as an example to describe initialization of the target sequence. One Gold sequence is constructed by the XOR of two m sequences, and a length of an output Gold sequence $c(n)$ is M, where $n=0, 1, \ldots, M-1$. The Gold sequence may be initialized in the following manner (that is, formula 1, formula 2, and formula 3):

$$c(n)=(x_1(n+N_c)+x_2(n+N_c))\bmod 2 \quad \text{formula 1}$$

$$x_1(n+31)=(x_1(n+3)+x_1(n))\bmod 2 \quad \text{formula 2}$$

$$x_2(n+31)=(x_2(n+3)+x_2(n+2)+x_2(n+1)+x_2(n))\bmod 2 \quad \text{formula 3}$$

$N_c$ denotes a cyclic shift value of the Gold sequence, $N_c=1600$, an initialization state of $x_1$ is $x_1(0)=1$, $x_1(n)=0$ and $n=0, 1, \ldots, 30$; and an initialization state of $x_2$ is $c_{init}=(2N_{ID}^{Cell}+1)\cdot 2^{16}+U_{ID}$, where $N_{ID}^{Cell}$ is an identifier (ID) of a cell or a virtual cell, and $U_{ID}$ is ID information of different UE or ID information of a group to which the UE belongs.

Further, the initialization mode of the target sequence may be $c_{init}=(2N_{ID}^{Cell}+1)\cdot 2^{16}+U_{ID}+I$, where $I\notin\{0,1\}$.

Formula 2 and formula 3 represent generator polynomials for generating two m sequences, and a transmitted Gold sequence is $d(n)=1-2c(n)$ Specifically, assuming that the number of symbols in the target sequence is S, $S=X\times N\times B\times S_f$, and symbols mapped to a time-frequency resource are quadrature phase shift keying (QPSK) modulation of the Gold sequence generated above, a length of the Gold sequence $c(n)$ $M=2\times S$. A symbol indicating mapping of a sequence to a target transmission resource is $$r(s) = \frac{1}{\sqrt{2}}(1-2\cdot c(2s)) + j\frac{1}{\sqrt{2}}(1-2\cdot c(2s+1)),$$

where $r(s)$ is time-domain symbol index information in a time-domain transmission resource, and $s=0, 1, \ldots, S-1$.

Optionally, in this embodiment of this disclosure, if the target sequence includes a ZC sequence, the first characteristic of the target signal may include at least one of the following: the root sequence of the target sequence or the cyclic shift value of the target sequence.

Optionally, in this embodiment of this disclosure, if the target sequence includes an m sequence, the first characteristic of the target signal may include at least one of the following: the generator polynomial of the target sequence or the cyclic shift value of the target sequence.

Optionally, in this embodiment of this disclosure, if the target sequence includes the Gold sequence, the first characteristic of the target signal may include at least one of the following: the generator polynomial of the target sequence, the cyclic shift value of the target sequence, or the initialization mode of the target sequence.

Step 202: The UE determines first information based on the first characteristic.

In this embodiment of this disclosure, in a case that the target channel or the target signal is used to indicate a first power-saving mode (power profile) of the UE, the first information is a second power-saving mode of the UE; or in a case that the target channel is used to indicate whether the UE monitors a PDCCH associated with the target channel, or the target signal is used to indicate whether the UE monitors a PDCCH associated with the target signal, the first information is a second characteristic of the PDCCH or the second power-saving mode of the UE.

Optionally, in this embodiment of this disclosure, the first power-saving mode or the second power-saving mode may include at least one of parameters A to G (and a value of the at least one of the parameters).

A: A first time gap, where the first time gap is a time gap between a first end time and a first start time, the first end time is an end time of the PDCCH, and the first start time is a start time of a physical downlink shared channel (PDSCH) scheduled by the PDCCH.

For example, the first time gap may be K0.

B: A second time gap, where the second time gap is a time gap between a second end time and a second start time, the second end time is an end time of the PDSCH scheduled by the PDCCH, and the second start time is a start time at which feedback information is transmitted.

For example, the second time gap may be K1.

Optionally, in this embodiment of this disclosure, the feedback information may be acknowledgement (ACK) information or negative acknowledgment (NACK) information.

C: A third time gap, where the third time gap is a time gap between the first end time and a third start time, and the third start time is a start time of a physical uplink shared channel (PUSCH) scheduled by the PDCCH.

For example, the third time gap may be K2.

D: A maximum number of downlink multiple-input multiple-output (MIMO) layers.

It should be noted that the maximum number of downlink MIMO layers may be understood as: a maximum number of downlink MIMO layers used when the UE receives data.

For example, a value of the maximum number of downlink MIMO layers may be 2, 4, or another value.

E: A maximum number of uplink MIMO layers.

It should be noted that the maximum number of uplink MIMO layers may be understood as: the maximum number of uplink MIMO layers used when the UE transmits data.

For example, a value of the maximum number of uplink MIMO layers may be 1, 2, or another value.

F: A parameter related to PDCCH monitoring.

Optionally, in this embodiment of this disclosure, the parameter related to PDCCH monitoring may include at least one of the following: a PDCCH monitoring periodicity, a PDCCH monitoring offset, or a PDCCH monitoring duration.

For example, a value of the PDCCH monitoring periodicity may be 20 slots or 20 milliseconds.

For another example, a value of the PDCCH monitoring offset may be one slot or 1 millisecond.

For another example, a value of the PDCCH monitoring duration may be two slots or 2 milliseconds.

G: A parameter related to DRX.

Optionally, in this embodiment of this disclosure, the parameter related to DRX may include at least one of the following: a CDRX cycle, a CDRX on duration timer, a CDRX inactivity timer, or other parameters.

Optionally, in this embodiment of this disclosure, the first power-saving mode or the second power-saving mode may further include at least one of parameters H to R (and a value of the at least one of the parameters).

H: The number of transmit antennas or the number of transmit channels.

It should be noted that the number of transmit antennas or the number of transmit channels may be understood as: the number of transmit antennas or the number of transmit channels used when the UE transmits data. Alternatively, the number of transmit antennas or the number of transmit channels may also be understood as: the maximum number of transmit antennas or the maximum number of transmit channels.

For example, a value of the number of transmit antennas or the number of transmit channels may be 1, 2, 4, or another value.

I: The number of receive antennas or the number of receive channels.

It should be noted that the number of receive antennas or the number of receive channels may be understood as: the number of receive antennas or the number of receive channels used when the UE receives data. Alternatively, the number of receive antennas or the number of receive channels may also be understood as: the maximum number of receive antennas or the maximum number of receive channels.

For example, a value of the number of receive antennas or the number of receive channels may be 2, 4, 8, or another value.

J: Simultaneously activated uplink component carriers.

It should be noted that the simultaneously activated uplink component carriers may be understood as uplink component carriers simultaneously activated when the UE transmits data.

K: Simultaneously activated downlink component carriers.

It should be noted that the simultaneously activated downlink component carriers may be understood as uplink component carriers simultaneously activated when the UE receives data.

L: A maximum rate for uplink transmission.

It should be noted that the maximum rate for uplink transmission may be understood as: a maximum rate for uplink transmission when the UE transmits data.

M: A maximum rate for downlink transmission.

It should be noted that the maximum rate for downlink transmission may be understood as: a maximum rate for downlink transmission when the UE receives data.

N: The number of channel state information (CSI) report(s) simultaneously processable by the UE.

O: The number of beam management report(s) simultaneously processable by the UE.

P: The number of measurement resource(s) simultaneously receivable or processable by the UE.

T: A delay related to a CSI report.

R: A delay related to a beam management report.

Optionally, in this embodiment of this disclosure, the parameter(s) included in the first power-saving mode and the parameter(s) included in the second power-saving mode have at least one parameter that is not common, or have different values for at least one parameter.

It may be understood that, in this embodiment of this disclosure, the parameter in the first power-saving mode or the second power-saving mode is a parameter used when the UE transmits or receives data.

Optionally, in this embodiment of this disclosure, the second characteristic may include at least one of the following: a BWP in which the PDCCH is located, an SS in which the PDCCH is located, a control resource set in which the PDCCH is located, a DCI format of the PDCCH (such as a DCI format 0_0 or another DCI format), or an RNTI of the PDCCH.

Optionally, in this embodiment of this disclosure, in a case that the target channel is used to indicate the first power-saving mode of the UE, the UE may determine the second power-saving mode of the UE based on the BWP in which the target channel is located.

Optionally, in this embodiment of this disclosure, in a case that the target channel is used to indicate the first power-saving mode of the UE, the UE may determine the second power-saving mode of the UE based on the SS in which the target channel is located.

Optionally, in this embodiment of this disclosure, in a case that the target channel is used to indicate the first power-saving mode of the UE, the UE may determine the second power-saving mode of the UE based on the control resource set in which the target channel is located.

Optionally, in this embodiment of this disclosure, in a case that the target channel is used to indicate the first power-saving mode of the UE, the UE may determine the second power-saving mode of the UE based on the DCI format of the target channel.

Optionally, in this embodiment of this disclosure, in a case that the target channel is used to indicate the first power-saving mode of the UE, the UE may determine the second power-saving mode of the UE based on the RNTI of the target channel.

Optionally, in this embodiment of this disclosure, when the target signal is used to indicate the first power-saving mode of the UE, the UE may determine the second power-saving mode of the UE based on the root sequence of the target sequence.

Optionally, in this embodiment of this disclosure, when the target signal is used to indicate the first power-saving mode of the UE, the UE may determine the second power-saving mode of the UE based on the cyclic shift value of the target sequence.

Optionally, in this embodiment of this disclosure, when the target signal is used to indicate the first power-saving mode of the UE, the UE may determine the second power-saving mode of the UE based on the generator polynomial of the target sequence.

Optionally, in this embodiment of this disclosure, when the target signal is used to indicate the first power-saving mode of the UE, the UE may determine the second power-saving mode of the UE based on the initialization mode of the target sequence.

Optionally, in this embodiment of this disclosure, when the target signal is used to indicate the first power-saving mode of the UE, the UE may determine the second power-saving mode of the UE based on the cover code of the target sequence.

Optionally, in this embodiment of this disclosure, in a case that the target channel is used to indicate whether the UE monitors the PDCCH associated with the target channel, the UE may determine the second characteristic of the PDCCH or the second power-saving mode of the UE based on the BWP in which the target channel is located.

Optionally, in this embodiment of this disclosure, in a case that the target channel is used to indicate whether the UE monitors the PDCCH associated with the target channel, the UE may determine the second characteristic of the PDCCH or the second power-saving mode of the UE based on the SS in which the target channel is located.

Optionally, in this embodiment of this disclosure, in a case that the target channel is used to indicate whether the UE monitors the PDCCH associated with the target channel, the UE may determine the second characteristic of the PDCCH or the second power-saving mode of the UE based on the control resource set in which the target channel is located.

Optionally, in this embodiment of this disclosure, in a case that the target channel is used to indicate whether the UE monitors the PDCCH associated with the target channel, the UE may determine the second characteristic of the PDCCH or the second power-saving mode of the UE based on the DCI format of the target channel.

Optionally, in this embodiment of this disclosure, in a case that the target channel is used to indicate whether the UE monitors the PDCCH associated with the target channel, the UE may determine the second characteristic of the PDCCH or the second power-saving mode of the UE based on the RNTI of the target channel.

Optionally, in this embodiment of this disclosure, when the target signal is used to indicate whether the UE monitors the PDCCH associated with the target signal, the UE may determine the second characteristic of the PDCCH or the second power-saving mode of the UE based on the root sequence of the target sequence.

Optionally, in this embodiment of this disclosure, when the target signal is used to indicate whether the UE monitors the PDCCH associated with the target signal, the UE may determine the second characteristic of the PDCCH or the second power-saving mode of the UE based on the cyclic shift value of the target sequence.

Optionally, in this embodiment of this disclosure, when the target signal is used to indicate whether the UE monitors the PDCCH associated with the target signal, the UE may determine the second characteristic of the PDCCH or the second power-saving mode of the UE based on the generator polynomial of the target sequence.

Optionally, in this embodiment of this disclosure, when the target signal is used to indicate whether the UE monitors the PDCCH associated with the target signal, the UE may determine the second characteristic of the PDCCH or the second power-saving mode of the UE based on the initialization mode of the target sequence.

Optionally, in this embodiment of this disclosure, when the target signal is used to indicate whether the UE monitors the PDCCH associated with the target signal, the UE may determine the second characteristic of the PDCCH or the second power-saving mode of the UE based on the cover code of the target sequence.

Figure 3:
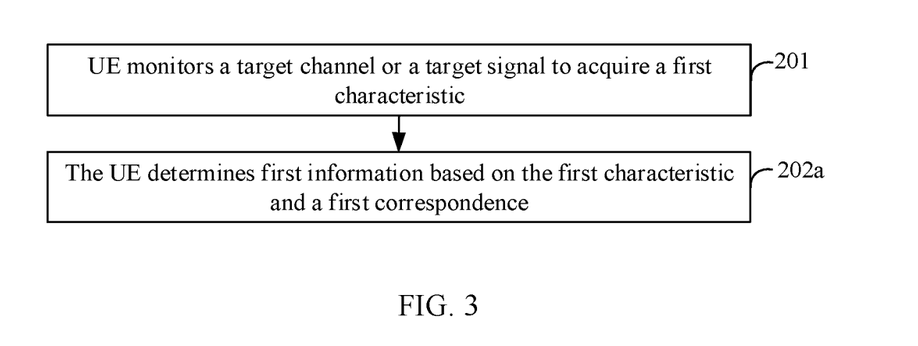
FIG. 3 is a second schematic diagram of an information determining method according to an embodiment of this disclosure.

Optionally, in this embodiment of this disclosure, with reference to FIG. 2, as shown in FIG. 3, the step 202 may be specifically implemented by the following step 202a.

Step 202a: The UE determines the first information based on the first characteristic and a first correspondence.

In this embodiment of this disclosure, the first correspondence is a correspondence between the first characteristic and the first information.

Optionally, in this embodiment of this disclosure, the first correspondence may be configured by a network device or predefined.

Optionally, in this embodiment of this disclosure, the network device may configure at least one third characteristic for the UE (the at least one third characteristic is a characteristic related to the target channel or the target signal), and configure at least one piece of second information for the UE, where each third characteristic corresponds to one piece of second information, the at least one third characteristic includes the first characteristic, and the at least one piece of second information includes the first information.

It may be understood that the UE may monitor the target channel or the target signal on the at least one third characteristic, and if the UE detects the target channel or the target signal on a fourth characteristic (the fourth characteristic is a characteristic in the at least one third characteristic), the UE determines the fourth characteristic as the first characteristic.

Example 1: Assuming that the first characteristic of the target channel is the BWP in which the target channel is located, the first information is the second power-saving mode of the UE. As shown in Table 1, an instance of a correspondence between the BWP in which the target channel is located and the second power-saving mode of the UE in this embodiment of this disclosure is shown in the form of a table.

TABLE 1

| BWP in which the target channel is located | Second power-saving mode of the UE |
|---|---|
| BWP 1 | Power-saving mode A |
| BWP 2 | Power-saving mode B |

In Table 1, if the BWP in which the target channel is located is the BWP 1, the UE may determine that the second power-saving mode of the UE is the power-saving mode A; and if the BWP in which the target channel is located is the BWP 2, the UE may determine that the second power-saving mode of the UE is the power-saving mode B.

Example 2: Assuming that the first characteristic of the target signal is the root sequence of the target sequence, the first information is the second power-saving mode of the UE. As shown in Table 2, an instance of a correspondence between the root sequence of the target sequence and the second power-saving mode of the UE in this embodiment of this disclosure is shown in the form of a table.

TABLE 2

| Root sequence of the target sequence | Second power-saving mode of the UE |
|---|---|
| Root sequence 1 | Power-saving mode A |
| Root sequence 2 | Power-saving mode B |

In Table 2, if the root sequence of the target sequence is the root sequence 1, the UE may determine that the second power-saving mode of the UE is the power-saving mode A; and if the root sequence of the target sequence is the root sequence 2, the UE may determine that the second power-saving mode of the UE is the power-saving mode B.

Example 3: Assuming that the first characteristic of the target channel is the SS in which the target channel is located, the first information is the second characteristic of the PDCCH (herein, description is made by using an example that the second characteristic of the PDCCH is the BWP in which the PDCCH is located). As shown in Table 3, an instance of a correspondence between the SS in which the target channel is located and the BWP in which the PDCCH is located in this embodiment of this disclosure is shown in the form of a table.

TABLE 3

| SS in which the target channel is located | BWP in which the PDCCH is located |
|---|---|
| SS 1 | BWP 1 |
| SS 2 | BWP 2 |

In Table 3, if the SS in which the target channel is located is the SS 1, the UE may determine that the BWP in which the PDCCH is located is the BWP 1; and if the SS in which the target channel is located is the SS 2, the UE may determine that the BWP in which the PDCCH is located is the BWP 2.

Example 4: Assuming that the first characteristic of the target signal is the initialization mode of the target sequence, the first information is the second characteristic of the PDCCH (herein, description is made by using an example that the second characteristic of the PDCCH is the RNTI of the PDCCH). As shown in Table 4, an instance of a correspondence between the initialization mode of the target sequence and the RNTI of the PDCCH in this embodiment of this disclosure is shown in the form of a table.

TABLE 4

| Initialization mode of the target sequence | RNTI of the PDCCH |
|---|---|
| Initialization mode 1 | RNTI X |
| Initialization mode 2 | RNTI Y |

In Table 4, if the initialization mode of the target sequence is the initialization mode 1, the UE may determine that the RNTI of the PDCCH is the RNTI X; and if the initialization mode of the target sequence is the initialization mode 2, the UE may determine that the RNTI of the PDCCH is the RNTI Y.

In this embodiment of this disclosure, because the UE can directly determine the first information based on the determined first characteristic and the first correspondence in the UE, and the network device is not required to indicate the first information to the UE by using signaling, signaling overheads between the network device and the UE may be reduced.

This embodiment of this disclosure provides the information determining method. The UE can monitor the target channel or the target signal to acquire a first characteristic of the target channel or the target signal, and determine the first information based on the first characteristic. Because based on the first characteristic of the target channel or the target signal, the UE can determine the first information, that is, determine the second characteristic of the PDCCH or the second power-saving mode of the UE, and the network device is not required to indicate the first information to the UE by using signaling, signaling overheads between the network device and the UE can be reduced.

Figure 4:
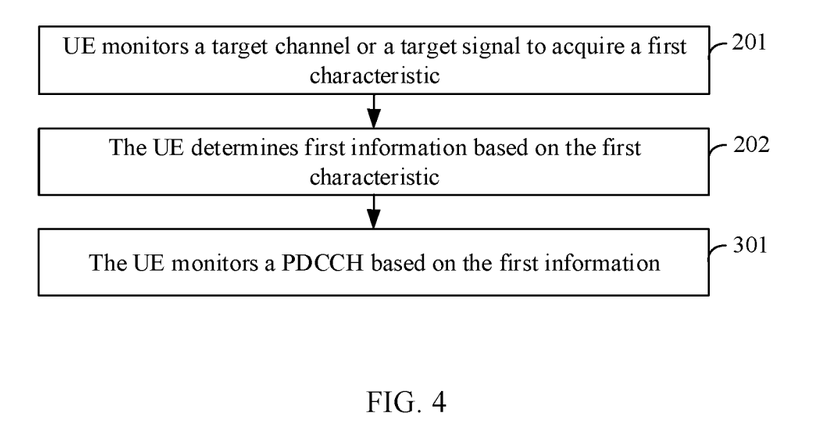
FIG. 4 is a third schematic diagram of an information determining method according to an embodiment of this disclosure.

Optionally, in this embodiment of this disclosure, the target channel is used to indicate whether the UE monitors the PDCCH associated with the target channel, or the target signal is used to indicate whether the UE monitors the PDCCH associated with the target signal. With reference to FIG. 2, as shown in FIG. 4, after step 202, the information determining method provided in this embodiment of this disclosure may further include step 301.

Step 301: The UE monitors the PDCCH based on the first information.

It may be understood that in a case that the target channel is used to indicate that the UE monitors the PDCCH associated with the target channel, or the target signal is used to indicate that the UE monitors the PDCCH associated with the target signal, the UE may monitor the PDCCH based on the first information.

Optionally, in this embodiment of this disclosure, the UE may monitor the PDCCH based on the second characteristic of the PDCCH, so as to reduce complexity of PDCCH blind detection.

Optionally, in this embodiment of this disclosure, the UE may monitor the PDCCH on the BWP in which the PDCCH is located.

Optionally, in this embodiment of this disclosure, the UE may monitor the PDCCH in the SS in which the PDCCH is located.

Optionally, in this embodiment of this disclosure, the UE may monitor the PDCCH based on the control resource set in which the PDCCH is located.

Optionally, in this embodiment of this disclosure, the UE may monitor the PDCCH based on the DCI format of the PDCCH.

Optionally, in this embodiment of this disclosure, the UE may monitor the
PDCCH based on the RNTI of the PDCCH.

Optionally, in this embodiment of this disclosure, the UE may monitor the PDCCH based on the second power-saving mode of the UE.

Optionally, in this embodiment of this disclosure, the UE may monitor the PDCCH based on the monitoring periodicity of the PDCCH.

Optionally, in this embodiment of this disclosure, the UE may monitor the PDCCH based on the monitoring offset of the PDCCH.

Optionally, in this embodiment of this disclosure, the UE may monitor the PDCCH based on the monitoring duration of the PDCCH.

Optionally, in this embodiment of this disclosure, the UE may monitor the PDCCH based on the DRX cycle.

In this embodiment of this disclosure, after receiving the target channel or the target signal, the UE can quickly monitor the PDCCH directly based on the first information determined by the first characteristic.

Figure 5:
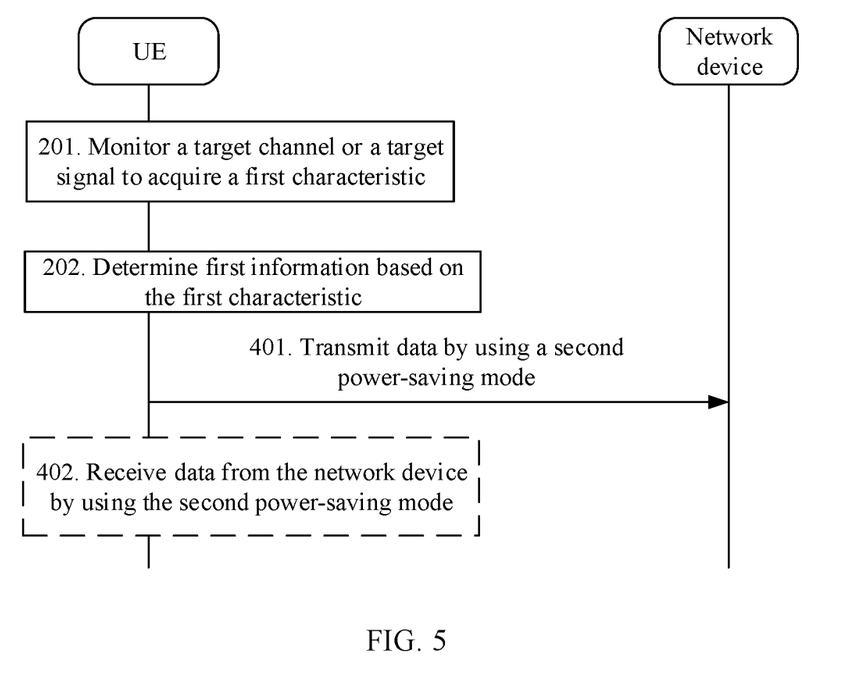
FIG. 5 is a fourth schematic diagram of an information determining method according to an embodiment of this disclosure.

Optionally, in this embodiment of this disclosure, the target channel or the target signal is used to indicate a first power-saving mode of the UE, or is used to indicate whether the UE monitors the PDCCH associated with the target signal. With reference to FIG. 2, as shown in FIG. 5, after the step 202, the information determining method provided in this embodiment of this disclosure may further include step 401 or step 402.

Step 401: The UE transmits data to the network device by using the second power-saving mode.

Optionally, in this embodiment of this disclosure, the UE may transmit the data to the network device by using a specified number of transmit antennas or a specified number of transmit channels (namely, a parameter in the second power-saving mode).

Optionally, in this embodiment of this disclosure, the UE may transmit the data to the network device by using the simultaneously activated uplink component carriers.

Correspondingly, the network device receives the data transmitted by the UE.

Step 402: The UE receives data from the network device by using the second power-saving mode.

Optionally, in this embodiment of this disclosure, the UE may receive data transmitted by the network device by using a specified number of receive antennas or a specified number of receive channels.

Optionally, in this embodiment of this disclosure, the UE may receive, by using the simultaneously activated downlink component carriers, the data transmitted by the network device.

In this embodiment of this disclosure, after receiving the target channel or target signal, the UE may transmit or receive the data by directly using the second power-saving mode determined based on the first characteristic.

It should be noted that in this embodiment of this disclosure, FIG. 3 to FIG. 5 are all illustrated with reference to FIG. 2, which does not constitute any limitation to this embodiment of this disclosure. It may be understood that in an actual implementation, FIG. 3 to FIG. 5 may alternatively be implemented with reference to any other figures that can be combined.

Figure 6:
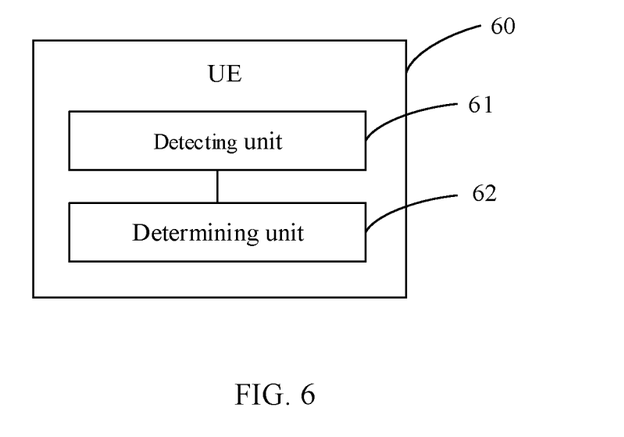
FIG. 6 is a first schematic structural diagram of UE according to an embodiment of this disclosure.

FIG. 6 is a possible schematic structural diagram of UE according to an embodiment of this disclosure. As shown in FIG. 6, the UE 60 provided in this embodiment of this disclosure may include a detecting unit 61 and a determining unit 62.

The detecting unit 61 is configured to monitor a target channel or a target signal to acquire a first characteristic, where the first characteristic is a characteristic of the target channel or the target signal. The determining unit 62 is configured to determine first information based on the first characteristic obtained by the detecting unit 61. When the target channel or the target signal is used to indicate a first power-saving mode of the UE, the first information is a second power-saving mode of the UE; or in a case that the target channel is used to indicate whether the UE monitors a PDCCH associated with the target channel, or the target signal is used to indicate whether the UE monitors a PDCCH associated with the target signal, the first information is a second characteristic of the PDCCH or the second power-saving mode of the UE.

In a possible implementation, the determining unit 62 is specifically configured to determine the first information based on the first characteristic and a first correspondence, where the first correspondence is a correspondence between the first characteristic and the first information.

In a possible implementation, the first correspondence is configured by a network device or predefined.

In a possible implementation, the first characteristic of the target channel may include at least one of the following: a BWP in which the target channel is located, an SS in which the target channel is located, a control resource set in which the target channel is located, a DCI format of the target channel, or an RNTI of the target channel.

In a possible implementation, the first characteristic of the target signal may include at least one of the following: a root sequence of a target sequence, a cyclic shift value of the target sequence, a generator polynomial of the target sequence, an initialization mode of the target sequence, or a cover code of the target sequence, where the target sequence is a sequence of the target signal.

In a possible implementation, the target sequence may include at least one of the following: a ZC sequence, an m sequence, or a Gold sequence.

In a possible implementation, if the target sequence includes the ZC sequence, the first characteristic of the target signal may include at least one of the following: the root sequence of the target sequence or the cyclic shift value of the target sequence; or if the target sequence includes the m sequence, the first characteristic of the target signal may include at least one of the following: the generator polynomial of the target sequence or the cyclic shift value of the target sequence; or if the target sequence includes the Gold sequence, the first characteristic of the target signal may include at least one of the following: the generator polynomial of the target sequence, the cyclic shift value of the target sequence, or the initialization mode of the target sequence.

In a possible implementation, the second characteristic may include at least one of the following: a BWP in which the PDCCH is located, an SS in which the PDCCH is located, a control resource set in which the PDCCH is located, a DCI format of the PDCCH, or an RNTI of the PDCCH.

In a possible implementation, the first power-saving mode or the second power-saving mode may include at least one of the following parameters:

a first time gap, where the first time gap is a time gap between a first end time and a first start time, the first end time is an end time of the PDCCH, and the first start time is a start time of a physical downlink shared channel PDSCH scheduled by the PDCCH;

a second time gap, where the second time gap is a time gap between a second end time and a second start time, the second end time is an end time of the PDSCH scheduled by the PDCCH, and the second start time is a start time at which feedback information is transmitted.

a third time gap, where the third time gap is a time gap between the first end time and a third start time, and the third start time is a start time of a physical uplink shared channel PUSCH scheduled by the PDCCH;

a maximum number of downlink multiple-input multiple-output MIMO layers;

a maximum number of uplink MIMO layers;

a parameter related to PDCCH monitoring; or a parameter related to DRX.

In a possible implementation, the first power-saving mode or the second power-saving mode may further include at least one of the following parameters:

the number of transmit antennas or the number of transmit channels;

the number of receive antennas or the number of receive channels;

simultaneously activated uplink component carriers;

simultaneously activated downlink component carriers;

a maximum rate for uplink transmission;

a maximum rate for downlink transmission;

the number of channel state information CSI report(s) simultaneously processable by the UE;

the number of beam management report(s) simultaneously processable by the UE;

the number of measurement resource(s) simultaneously receivable or processable by the UE;

a delay related to a CSI report; or a delay related to a beam management report.

In a possible implementation, the parameter(s) included in the first power-saving mode and the parameter(s) included in the second power-saving mode have at least one parameter that is not common.

Figure 7:
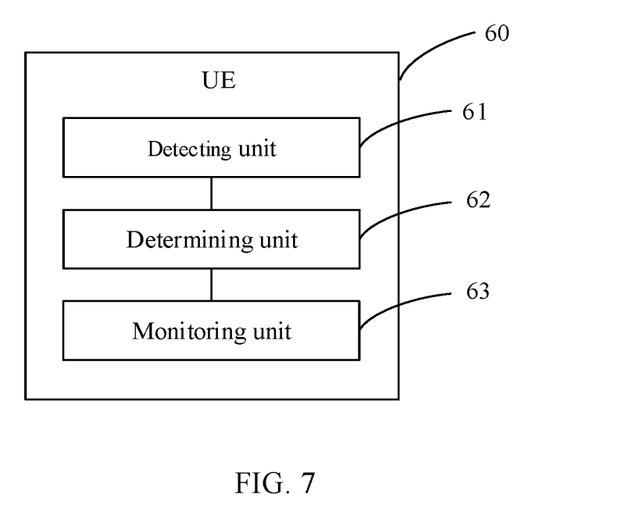
FIG. 7 is a second schematic structural diagram of UE according to an embodiment of this disclosure.

In a possible implementation, the target channel is used to indicate whether the UE monitors the PDCCH associated with the target channel, or the target signal is used to indicate whether the UE monitors the PDCCH associated with the target signal. With reference to FIG. 6, as shown in FIG. 7, the UE 60 provided in this embodiment of this disclosure may further include: a monitoring unit 63. The monitoring unit 63 is configured to: after the determining unit 62 determines the first information based on the first characteristic, monitor the PDCCH based on the first information determined by the determining unit 62.

Figure 8:
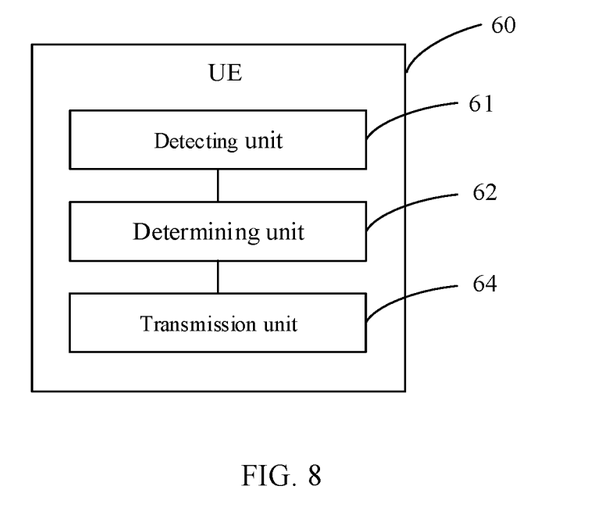
FIG. 8 is a third schematic structural diagram of UE according to an embodiment of this disclosure.

In a possible implementation, the target channel or the target signal is used to indicate the first power-saving mode of the UE, or is used to indicate whether the UE monitors the PDCCH associated with the target signal. With reference to FIG. 6, as shown in FIG. 8, the UE 60 provided in this embodiment of this disclosure may further include: a transmission unit 64. The transmission unit 64 is configured to: after the determining unit 62 determines the first information based on the first characteristic, transmit or receive data by using the second power-saving mode determined by the determining unit 62.

The UE provided in this embodiment of this disclosure can implement the processes implemented by the UE in the foregoing method embodiment. To avoid repetition, details are not described herein again.

This embodiment of this disclosure provides the UE. The UE can monitor the target channel or the target signal to acquire the first characteristic of the target channel or the target signal, and determine first information based on the first characteristic. Because based on the first characteristic of the target channel or the target signal, the UE can determine the first information, that is, determine the second characteristic of the PDCCH or the second power-saving mode of the UE, and the network device is not required to indicate the first information to the UE by using signaling, signaling overheads between the network device and the UE can be reduced.

Figure 9:
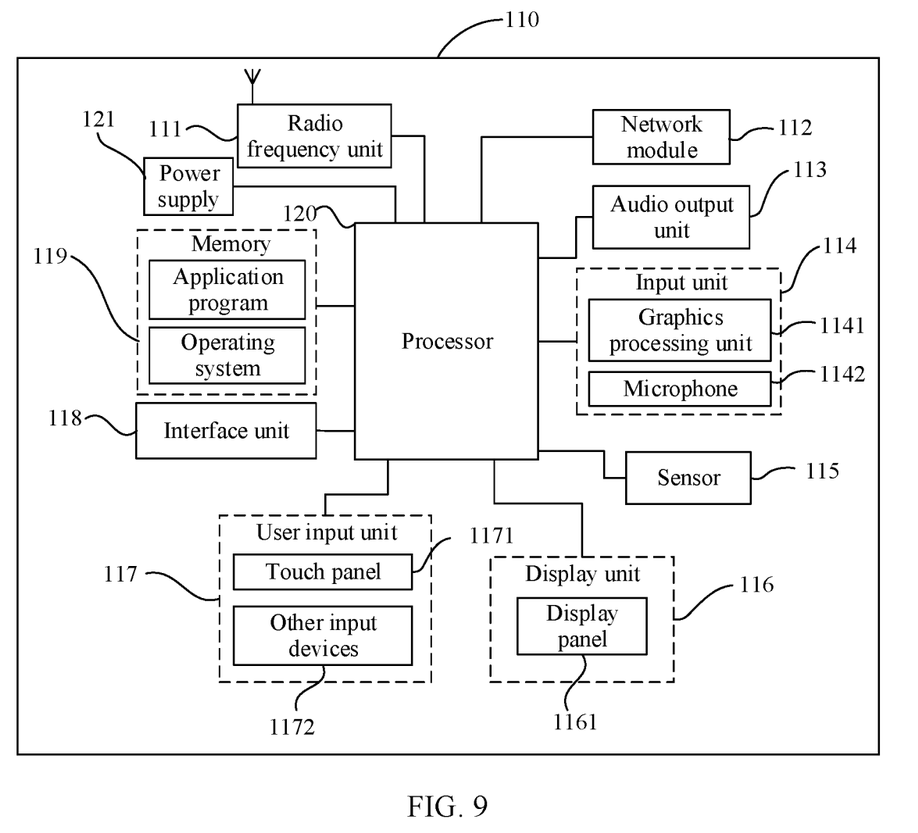
FIG. 9 is a schematic hardware diagram of UE according to an embodiment of this disclosure.

FIG. 9 is a schematic hardware diagram of UE according to an embodiment of the present application. As shown in FIG. 9, the UE 110 includes but is not limited to: a radio frequency unit 111, a network module 112, an audio output unit 113, an input unit 114, a sensor 115, a display unit 116, a user input unit 117, an interface unit 118, a memory 119, a processor 120, a power supply 121, and other components.

It should be noted that persons skilled in the art may understand that the structure of the UE shown in FIG. 9 does not constitute a limitation to the UE. The UE may include more or fewer components than those shown in FIG. 9, or a combination of some components, or an arrangement of different components. For example, in this embodiment of this disclosure, the UE includes but is not limited to a mobile phone, a tablet computer, a notebook computer, a palmtop computer, a vehicle-mounted terminal, a wearable device, and a pedometer.

The processor 120 is configured to: monitor the target channel or the target signal to acquire the first characteristic, where the first characteristic is a characteristic of the target channel or the target signal; and determine the first information based on the first characteristic, where in a case that the target channel or the target signal is used to indicate a first power-saving mode of the UE, the first information is a second power-saving mode of the UE; or in a case that the target channel is used to indicate whether the UE monitors a PDCCH associated with the target channel, or the target signal is used to indicate whether the UE monitors a PDCCH associated with the target signal, the first information is a second characteristic of the PDCCH or the second power-saving mode of the UE.

This embodiment of this disclosure provides the UE. The UE can monitor the target channel or the target signal to acquire the first characteristic of the target channel or the target signal, and determine first information based on the first characteristic. Because based on the first characteristic of the target channel or the target signal, the UE can determine the first information, that is, determine the second characteristic of the PDCCH or the second power-saving mode of the UE, and the network device is not required to indicate the first information to the UE by using signaling, signaling overheads between the network device and the UE can be reduced.

It should be understood that, in the embodiments of this disclosure, the radio frequency unit 111 may be configured to receive and transmit information or receive and transmit a signal in a call process. Specifically, the radio frequency unit 111 receives downlink data from a base station and transmits the downlink data to the processor 120 for processing; and transmits uplink data to the base station. Generally, the radio frequency unit 111 includes, but is not limited to, an antenna, at least one amplifier, a transceiver, a coupler, a low noise amplifier, a duplexer, and the like. In addition, the radio frequency unit 111 may further communicate with another device by using a wireless communications system and network.

The UE provides a user with wireless broadband Internet access by using the network module 112, for example, helps the user transmit and receive emails, browse web pages, and access streaming media.

The audio output unit 113 may convert audio data received by the radio frequency unit 111 or the network module 112 or stored in the memory 119 into an audio signal, and output the audio signal into sound. In addition, the audio output unit 113 may also provide audio output related to a specific function performed by the UE 110 (for example, call signal receiving sound or message receiving sound). The audio output unit 113 includes a speaker, a buzzer, a receiver, and the like.

The input unit 114 is configured to receive an audio or video signal. The input unit 114 may include a graphics processing unit (GPU) 1141 and a microphone 1142. The graphics processing unit 1141 processes image data of a static image or a video obtained by an image capturing apparatus (such as, a camera) in a video capturing mode or an image capturing mode. A processed image frame can be displayed on the display unit 116. The image frame processed by the graphics processing unit 1141 can be stored in the memory 119 (or another storage medium) or transmitted via the radio frequency unit 111 or the network module 112. The microphone 1142 may receive sound and can process such sound into audio data. Processed audio data may be converted, in telephone call mode, into a format that can be transmitted to a mobile communication base station via the radio frequency unit 111 for output.

The UE 110 further includes at least one sensor 115, for example, an optical sensor, a motion sensor, and other sensors. Specifically, the optical sensor includes an ambient light sensor and a proximity sensor, where the ambient light sensor may adjust brightness of a display panel 1161 based on brightness of ambient light, and the proximity sensor may turn off the display panel 1161 when the UE 110 moves close to an ear. As a type of motion sensor, an accelerometer sensor can detect magnitudes of accelerations in all directions (usually three axes), can detect a magnitude and a direction of gravity when the mobile phone is in a static state, and can be applied to UE posture recognition (such as screen switching between portrait and landscape, related games, and magnetometer posture calibration), functions related to vibration recognition (such as pedometer and tapping), and the like. The sensor 115 may also include a fingerprint sensor, a pressure sensor, an iris sensor, a molecular sensor, a gyroscope, a barometer, a hygrometer, a thermometer, an infrared sensor, and the like. Details are not described herein.

The display unit 116 is configured to display information entered by a user or information provided for the user. The display unit 116 may include a display panel 1161, and the display panel 1161 may be configured in the form of liquid crystal display (LCD), organic light-emitting diode (OLED), or the like.

The user input unit 117 may be configured to receive input numeric or character information, and generate key signal inputs related to user settings and function control of the UE. Specifically, the user input unit 117 includes a touch panel 1171 and other input devices 1172. The touch panel 1171 is also referred to as a touchscreen, and may collect a touch operation performed by a user on or near the touch panel 1171 (for example, an operation performed by a user on the touch panel 1171 or near the touch panel 1171 by using any proper object or accessory such as a finger or a stylus). The touch panel 1171 may include two parts: a touch detection apparatus and a touch controller. The touch detection apparatus detects a touch position of the user, detects a signal brought by the touch operation, and transmits the signal to the touch controller. The touch controller receives touch information from the touch detection apparatus, converts the touch information into touch point coordinates, and transmits the touch point coordinates to the processor 120, and can receive and execute a command transmitted by the processor 120. In addition, the touch panel 1171 may be implemented in various types such as resistive, capacitive, infrared, and surface acoustic wave. In addition to the touch panel 1171, the user input unit 117 may further include other input devices 1172. Specifically, the other input devices 1172 may include but are not limited to, a physical keyboard, functional keys (for example, a volume control key and a switch key), a trackball, a mouse, and a joystick. Details are not described herein again.

Further, the touch panel 1171 may cover the display panel 1161. When detecting a touch operation on or near the touch panel 1171, the touch panel 1171 transmits the touch operation to the processor 120 to determine a type of a touch event. Then the processor 120 provides corresponding visual output on the display panel 1161 based on the type of the touch event. Although in FIG. 9, the touch panel 1171 and the display panel 1161 are configured as two independent components to implement input and output functions of the UE, in some embodiments, the touch panel 1171 and the display panel 1161 may be integrated to implement the input and output functions of the UE. Details are not limited herein.

The interface unit 118 is an interface for connecting an external apparatus to the UE 110. For example, the external apparatus may include a wired or wireless headset jack, an external power supply (or a battery charger) port, a wired or wireless data port, a storage card port, a port for connecting an apparatus having an identification module, an audio input/output (I/O) port, a video I/O port, a headset jack, or the like. The interface unit 118 may be configured to receive an input (for example, data information and power) from the external apparatus and transmit the received input to one or more elements in the UE 110, or transmit data between the UE 110 and the external apparatus.

The memory 119 may be configured to store software programs and various data. The memory 119 may mainly include a program storage area and a data storage area. The program storage area may store an operating system, an application program required by at least one function (such as a sound playback function and an image playback function), and the like. The data storage area may store data (such as audio data and an address book) created based on use of the mobile phone, and the like. In addition, the memory 119 may include a high-speed random access memory, and may further include a nonvolatile memory, for example, at least one disk storage device, a flash memory device, or another volatile solid-state storage device.

The processor 120 is a control center of the UE, connects various parts of the entire UE by using various interfaces and circuits, and performs various functions of the UE and processes data by running or executing software programs or modules stored in the memory 119 and invoking data stored in the memory 119, to perform overall monitoring on the UE. The processor 120 may include one or more processing units. Optionally, the processor 120 may integrate an application processor and a modem processor. The application processor mainly processes an operating system, a user interface, an application program, and the like. The modem processor mainly processes wireless communication. It should be understood that the modem processor may be not integrated in the processor 120.

The UE 110 may further include the power supply 121 (such as a battery) that supplies power to each component. Optionally, the power supply 121 may be logically connected to the processor 120 by using a power management system, so as to implement functions such as charging, discharging, and power consumption management by using the power management system.

In addition, the UE 110 includes some function modules not shown. Details are not described herein.

Optionally, an embodiment of this disclosure further provides UE, including the processor 120 and the memory 119 that are shown in FIG. 9, and a computer program stored in the memory 119 and capable of running on the processor 120, where when the computer program is executed by the processor 120, the processes of the foregoing method embodiments are implemented, with the same technical effects achieved. To avoid repetition, details are not described herein again.

An embodiment of this disclosure further provides a computer-readable storage medium. The computer-readable storage medium stores a computer program, and when the computer program is executed by the processor 120 shown in FIG. 9, the processes of the foregoing method embodiments are implemented, with the same technical effects achieved. To avoid repetition, details are not described herein again. The computer-readable storage medium is, for example, a read-only memory (ROM), a random access memory (RAM), a magnetic disk, a compact disc, or the like.

It should be noted that, in this specification, the terms "include", "comprise", or any of their variants are intended to cover a non-exclusive inclusion, so that a process, a method, an article, or an apparatus that includes a series of elements not only includes those elements but also includes other elements that are not expressly listed, or further includes elements inherent to such a process, method, article, or apparatus. In the absence of more restrictions, an element defined by "including a . . . " does not exclude another same element in a process, method, article, or apparatus that includes the element.

By means of the foregoing description of the implementations, persons skilled in the art may clearly understand that the method in the foregoing embodiments may be implemented by software with a necessary general hardware platform. Certainly, the method in the foregoing embodiments may also be implemented by hardware. However, in many cases, the former is a preferred implementation. Based on such an understanding, the technical solutions of this disclosure essentially or the part contributing to the prior art may be implemented in the form of a software product. The computer software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of this disclosure.

The embodiments of this disclosure are described above with reference to the accompanying drawings, but this disclosure is not limited to the foregoing specific implementations. The foregoing specific implementations are merely exemplary instead of restrictive. Under the enlightenment of this disclosure, persons of ordinary skills in the art may make many forms without departing from the aims of this disclosure and the protection scope of claims, all of which fall within the protection of this disclosure.

What is claimed is:

1. An information determining method, applied to user equipment UE, wherein the method comprises:
    monitoring a target channel or a target signal to acquire a first characteristic, wherein the first characteristic is a characteristic of the target channel or the target signal; and
    determining first information based on the first characteristic,
    wherein the first characteristic of the target signal comprises at least one of the following: a cyclic shift value of a target sequence, a generator polynomial of the target sequence, an initialization mode of the target sequence, or a cover code of the target sequence, wherein the target sequence is a sequence of the target signal; wherein
    in a case that the target channel or the target signal is used to indicate a first power-saving mode of the UE, the first information is a second power-saving mode of the UE; or in a case that the target channel is used to indicate whether the UE monitors a physical downlink control channel PDCCH associated with the target channel, or the target signal is used to indicate whether the UE monitors a PDCCH associated with the target signal, the first information is the second power-saving mode of the UE;
    wherein the first power-saving mode or the second power-saving mode comprises at least one of the following parameters:
    a first time gap, wherein the first time gap is a time gap between a first end time and a first start time, the first end time is an end time of the PDCCH, and the first start time is a start time of a physical downlink shared channel PDSCH scheduled by the PDCCH;
    a second time gap, wherein the second time gap is a time gap between a second end time and a second start time, the second end time is an end time of the PDSCH scheduled by the PDCCH, and the second start time is a start time at which feedback information is transmitted;
    a third time gap, wherein the third time gap is a time gap between the first end time and a third start time, and the third start time is a start time of a physical uplink shared channel PUSCH scheduled by the PDCCH;
    maximum number of downlink multiple-input multiple-output MIMO layers; or maximum number of uplink MIMO layers.

2. The method according to claim 1, wherein the determining the first information based on the first characteristic comprises:
    determining the first information based on the first characteristic and a first correspondence, wherein
    the first correspondence is a correspondence between the first characteristic and the first information.

3. The method according to claim 2, wherein the first correspondence is configured by a network device or pre-defined.

4. The method according to claim 1, wherein the first characteristic of the target channel comprises at least one of the following: a bandwidth part BWP in which the target channel is located, a search space SS in which the target channel is located, a control resource set in which the target channel is located, a downlink control information DCI format of the target channel, or a radio network temporary identifier RNTI of the target channel.

5. The method according to claim 1, wherein the target sequence comprises at least one of the following: a ZC sequence, an m sequence, or a Gold sequence.

6. The method according to claim 5, wherein in a case that the target sequence comprises the ZC sequence, the first characteristic of the target signal comprises at least one of the following: the root sequence of the target sequence or the cyclic shift value of the target sequence; or
    in a case that the target sequence comprises the m sequence, the first characteristic of the target signal comprises at least one of the following: the generator polynomial of the target sequence or the cyclic shift value of the target sequence; or
    in a case that the target sequence comprises the Gold sequence, the first characteristic of the target signal comprises at least one of the following: the generator polynomial of the target sequence, the cyclic shift value of the target sequence, or the initialization mode of the target sequence.

7. The method according to claim 1, wherein the second characteristic comprises at least one of the following: a bandwidth part BWP in which the PDCCH is located, a search space SS in which the PDCCH is located, a control resource set in which the PDCCH is located, a downlink control information DCI format of the PDCCH, or a radio network temporary identifier RNTI of the PDCCH.

8. The method according to claim 1, wherein the first power-saving mode or the second power-saving mode further comprises at least one of the following parameters:
    number of transmit antennas or the number of transmit channels;
    number of receive antennas or the number of receive channels;
    simultaneously activated uplink component carriers;
    simultaneously activated downlink component carriers;
    a maximum rate for uplink transmission;
    a maximum rate for downlink transmission;
    number of channel state information CSI report(s) simultaneously processable by the UE;

number of beam management report(s) simultaneously processable by the UE;
number of measurement resource(s) simultaneously receivable or processable by the UE;
a delay related to a CSI report; or
a delay related to a beam management report.

9. The method according to claim 1, wherein the target channel is used to indicate whether the UE monitors the PDCCH associated with the target channel, or the target signal is used to indicate whether the UE monitors the PDCCH associated with the target signal; and
after the determining the first information based on the first characteristic, the method further comprises:
monitoring the PDCCH based on the first information.

10. The method according to claim 1, wherein the target channel or the target signal is used to indicate the first power-saving mode of the UE, or is used to indicate whether the UE monitors the PDCCH associated with the target signal; and
after the determining the first information based on the first characteristic, the method further comprises:
transmitting or receiving data by using the second power-saving mode.

11. The method according to claim 1, wherein there are a plurality of first characteristics, and there are a plurality of second power-saving modes of the UE, and the method further comprises:
determining different second power-saving modes of the UE based on different first characteristics correspond respectively.

12. The method according to claim 1, further comprising: avoiding directly determining the second power-saving mode of the UE through signaling.

13. The method according to claim 1, wherein the target channel is a channel similar to PDCCH, and the target channel carries downlink control information (DCI).

14. User equipment UE, comprising a processor, a memory, and a computer program stored in the memory and capable of running on the processor, wherein the computer program is executed by the processor to implement:
monitoring a target channel or a target signal to acquire a first characteristic, wherein the first characteristic is a characteristic of the target channel or the target signal; and
determining first information based on the first characteristic,
wherein the first characteristic of the target signal comprises at least one of the following: a cyclic shift value of a target sequence, a generator polynomial of the target sequence, an initialization mode of the target sequence, or a cover code of the target sequence, wherein the target sequence is a sequence of the target signal; wherein
in a case that the target channel or the target signal is used to indicate a first power-saving mode of the UE, the first information is a second power-saving mode of the UE; or in a case that the target channel is used to indicate whether the UE monitors a physical downlink control channel PDCCH associated with the target channel, or the target signal is used to indicate whether the UE monitors a PDCCH associated with the target signal, the first information is the second power- saving mode of the UE;
wherein the first power-saving mode or the second power-saving mode comprises at least one of the following parameters:

a first time gap, wherein the first time gap is a time gap between a first end time and a first start time, the first end time is an end time of the PDCCH, and the first start time is a start time of a physical downlink shared channel PDSCH scheduled by the PDCCH;
a second time gap, wherein the second time gap is a time gap between a second end time and a second start time, the second end time is an end time of the PDSCH scheduled by the PDCCH, and the second start time is a start time at which feedback information is transmitted;
a third time gap, wherein the third time gap is a time gap between the first end time and a third start time, and the third start time is a start time of a physical uplink shared channel PUSCH scheduled by the PDCCH;
maximum number of downlink multiple-input multiple-output MIMO layers; or
maximum number of uplink MIMO layers.

15. The UE according to claim 14, wherein the computer program is further executed by the processor to implement:
determining the first information based on the first characteristic and a first correspondence,
wherein
the first correspondence is a correspondence between the first characteristic and the first information.

16. The UE according to claim 14, wherein the first characteristic of the target channel comprises at least one of the following: a bandwidth part BWP in which the target channel is located, a search space SS in which the target channel is located, a control resource set in which the target channel is located, a downlink control information DCI format of the target channel, or a radio network temporary identifier RNTI of the target channel.

17. The UE according to claim 14, wherein the second characteristic comprises at least one of the following: a bandwidth part BWP in which the PDCCH is located, a search space SS in which the PDCCH is located, a control resource set in which the PDCCH is located, a downlink control information DCI format of the PDCCH, or a radio network temporary identifier RNTI of the PDCCH.

18. The UE according to claim 14, wherein the first power-saving mode or the second power-saving mode further comprises at least one of the following parameters:
number of transmit antennas or the number of transmit channels;
number of receive antennas or the number of receive channels;
simultaneously activated uplink component carriers;
simultaneously activated downlink component carriers;
a maximum rate for uplink transmission;
a maximum rate for downlink transmission;
number of channel state information CSI report(s) simultaneously processable by the UE;
number of beam management report(s) simultaneously processable by the UE;
number of measurement resource(s) simultaneously receivable or processable by the UE;
a delay related to a CSI report; or
a delay related to a beam management report.

19. A non-transitory computer-readable storage medium, wherein the non-transitory computer-readable storage medium stores a computer program, and the computer program is executed by a processor to implement:
monitoring a target channel or a target signal to acquire a first characteristic, wherein the first characteristic is a characteristic of the target channel or the target signal; and determining first information based on the first characteristic, wherein the first characteristic of the target signal comprises at least one of the following: a cyclic shift value of a target sequence, a generator polynomial of the target sequence, an initialization mode of the target sequence, or a cover code of the target sequence, wherein the target sequence is a sequence of the target signal; wherein in a case that the target channel or the target signal is used to indicate a first power-saving mode of the UE, the first information is a second power-saving mode of the UE; or in a case that the target channel is used to indicate whether the UE monitors a physical downlink control channel PDCCH associated with the target channel, or the target signal is used to indicate whether the UE monitors a PDCCH associated with the target signal, the first information is the second power-saving mode of the UE;

wherein the first power-saving mode or the second power-saving mode comprises at least one of the following parameters:

a first time gap, wherein the first time gap is a time gap between a first end time and a first start time, the first end time is an end time of the PDCCH, and the first start time is a start time of a physical downlink shared channel PDSCH scheduled by the PDCCH;

a second time gap, wherein the second time gap is a time gap between a second end time and a second start time, the second end time is an end time of the PDSCH scheduled by the PDCCH, and the second start time is a start time at which feedback information is transmitted;

a third time gap, wherein the third time gap is a time gap between the first end time and a third start time, and the third start time is a start time of a physical uplink shared channel PUSCH scheduled by the PDCCH;

maximum number of downlink multiple-input multiple-output MIMO layers; or maximum number of uplink MIMO layers.

20. The non-transitory computer-readable storage medium according to claim 19, wherein the first power-saving mode or the second power-saving mode further comprises at least one of the following parameters:

number of transmit antennas or the number of transmit channels;

number of receive antennas or the number of receive channels;

simultaneously activated uplink component carriers;

simultaneously activated downlink component carriers;

a maximum rate for uplink transmission;

a maximum rate for downlink transmission;

number of channel state information CSI report(s) simultaneously processable by the UE;

number of beam management report(s) simultaneously processable by the UE;

number of measurement resource(s) simultaneously receivable or processable by the UE;

a delay related to a CSI report; or a delay related to a beam management report.

* * * * *